Aug. 7, 1928. 1,680,216

W. HERZOG

ELECTROMAGNETIC INSTRUMENT

Filed April 12, 1927   2 Sheets-Sheet 1

Inventor:
Wilhelm Herzog,
by
His Attorney.

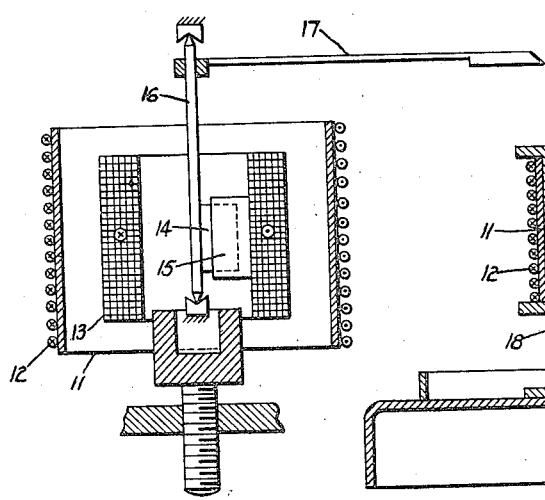
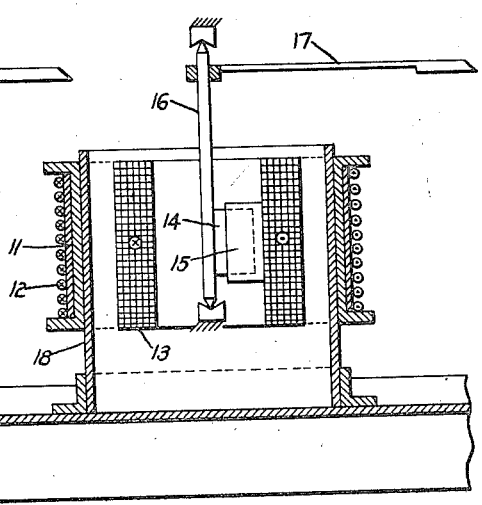
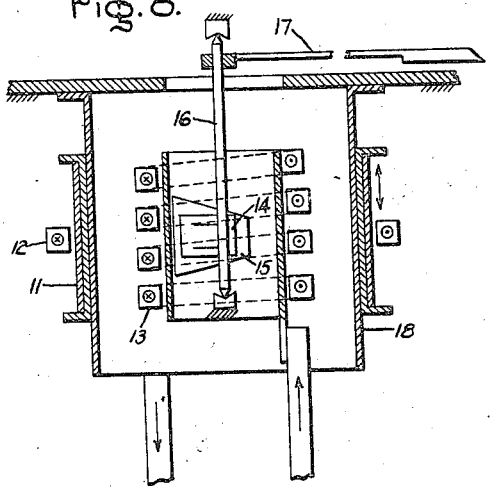
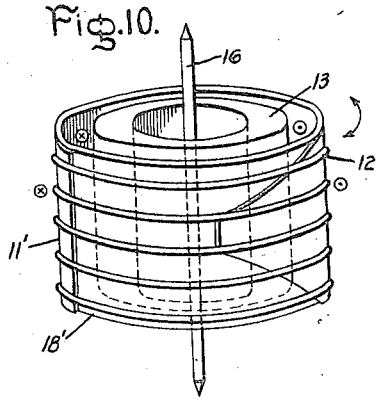
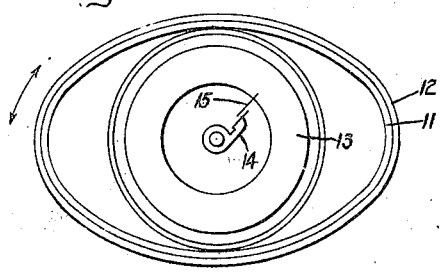

Patented Aug. 7, 1928.

1,680,216

UNITED STATES PATENT OFFICE.

WILHELM HERZOG, OF CHARLOTTENBURG, GERMANY, ASSIGNOR TO GENERAL ELECTRIC COMPANY, A CORPORATION OF NEW YORK.

ELECTROMAGNETIC INSTRUMENT.

Application filed April 12, 1927, Serial No. 183,221, and in Germany July 10, 1926.

My invention relates to electromagnetic devices such as measuring instruments and relays and its object is to compensate for the hysteresis error in such devices.

The invention will be described as applied to the well known magnetic vane indicating instrument where the hysteresis error is particularly serious. When such an instrument is subject to varying current it is known that the indication is slightly greater for a given current in the energizing winding when the current is decreasing than when it is increasing. This is caused by the hysteresis of the magnetic vane or vanes. It has heretofore been proposed to correct this error by providing the instrument with two opposing torque systems the energizing coils of which are connected in series so that the hysteresis error of one system will neutralize the hysteresis error in the other system. This gives a very weak resultant torque since if the error is eliminated the hysteresis losses in the two systems must be equal and this naturally brings the opposing torques to nearly the same value.

In accordance with my invention a single torque system is employed and the torque producing field is influenced by an additional hysteresis element in such a way as to neutralize the hysteresis error of the instrument.

The features of my invention which are believed to be novel and patentable will be pointed out in the claims appended hereto. For a better understanding of my invention reference is made in the following description to the accompanying drawings, in which Figs. 1 to 5 inclusive illustrate flux modifying effects which will be referred to in explaining the theory of my invention, and Figs. 6 to 10 inclusive show different ways of applying the invention to magnetic vane instruments.

Figure 1:
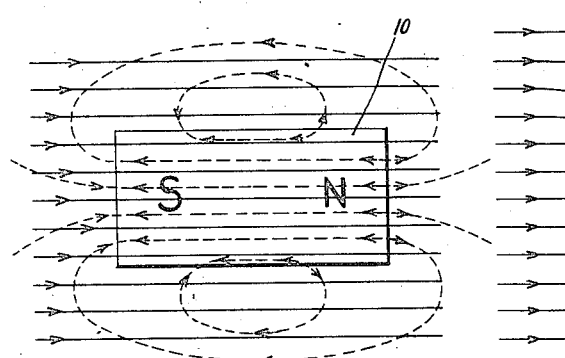
Figure 2:
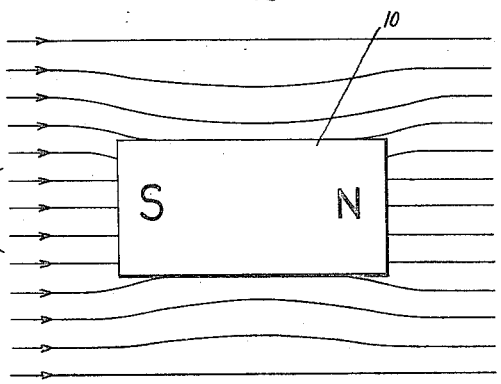
Figure 3:
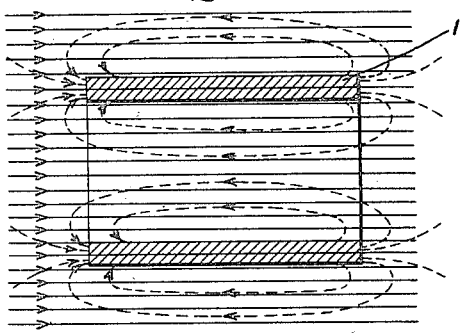
Figure 4:
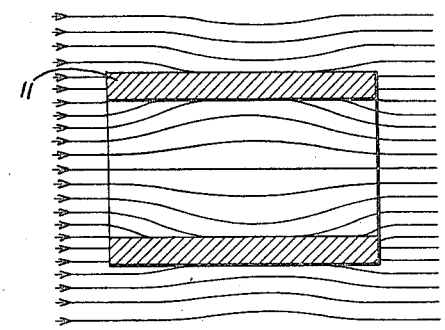

Referring to Figs. 1 and 2 if we place a magnetic bar 10 in a homogeneous magnetic field such as is indicated by the full line arrows of Fig. 1, the field is modified in the manner depicted in Fig. 2. The modification of the field is known to be due to the field of the bar itself indicated by the dash line arows shown in Fig. 1 and the strength of which depends upon the free magnetism occurring at the ends of the bar. It is obvious that the field strength of the bar itself is influenced by its hysteresis. If the magnetic member is made in the form of a cylinder 11 as shown in Fig. 3 the field of the cylinder itself assumes the shape there indicated by the dotted line arrows and when placed in a homogeneous field the cylinder influences such field in the manner indicated in Fig. 4 causing a weakening of the field inside the cylinder. Now, if as in Fig. 5 the iron cylinder is surrounded by a winding 12 traversed by a current a field will develop approximately as represented. Due to the hysteresis of the cylinder and its free field strength the internal magnetic field at the center of the cylinder will be weaker for a given current in the winding 12 when the current is decreasing than when increasing. That is to say, more of the internal field flux will be drawn to the cylinder and less will traverse the internal air space.

Figure 5:
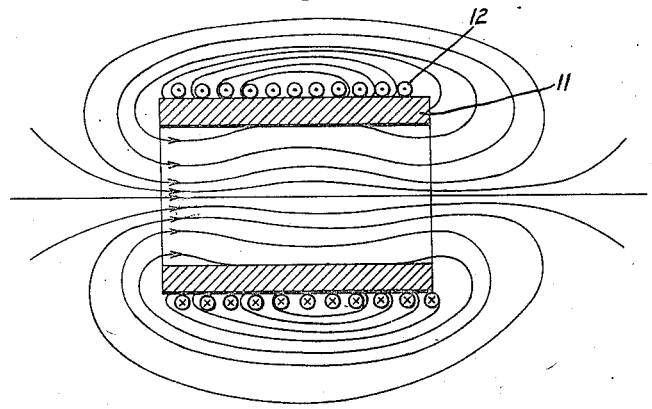

In accordance with my invention, a hysteresis element such as is shown in Fig. 5 is placed around the energizing winding of the measuring instrument as shown in Fig. 6 and the two windings are connected so as to produce proportionate fluxes in the same direction at any given instant. The new instrument is shown in section, 11 and 12 representing the additional hysteresis element. 13 represents the main energizing winding of the instrument, 14 and 15 the movable and stationary magnetic vanes respectively, 16 the shaft, and 17 the pointer. The windings 12 and 13 are connected in series or otherwise arranged so that they carry proportionate currents and produce internal fluxes in the same direction. By this arrangement it is evident that when the currents in the windings decrease from a steady or an increasing value, the influence of the additional hysteresis element is to slightly weaken the field through the magnetic vanes and when the current increases its effect is to slightly strengthen the field through the magnetic vanes. The influence produced by the additional coil and cylinder is superimposed upon the main field and neutralizes the hysteresis influence of the iron vanes so that the torque producing flux carried by said vanes is always proportional to the current irrespective of whether it is increasing or decreasing. The extent of such compensation may be varied in various ways, such as by changing the relation of the ampere turns in coils 12 and 13, changing the material of which cylinder 11 is made, changing the length and diameter of cylinder 11 or changing its position with respect to coil 13. In Figs. 7 and 8 I have shown how the cylinder 11 may be moved up and down on a non-magnetic support 18 for the purpose of adjusting this compensation over the whole range of deflection.

Fig. 8 shows the construction of a heavy current instrument.

In Figs. 9 and 10 I have shown modifications in which the hysteresis compensation may vary for different positions of the movable magnetic vane. Thus in Fig. 9 the shape of the cylinder 11 and its coil 12 are oblong instead of circular. It will be evident that the influence of the compensating means will vary in proportion to the nearness of the movable vane 14 to the cylinder 11 which will vary with the deflection. In Fig. 10 the closed cylinder is replaced by a wedge-shaped magnetic member 11' curved in the shape indicated which is supported by a non-magnetic cylinder 18' which may be rotatably adjustable. It is evident that when the movable vane of the instrument, not shown, is opposite the opening in the member 11' the compensation will be a minimum and that it will gradually increase as the vane is moved around counter-clockwise toward the larger end of member 11'. In this way the relative compensation at different deflections may be adjusted and exact compensation for all deflections may be obtained. The same principles may be applied to other types of electromagnetic devices other than the one described herein.

In accordance with the provisions of the patent statutes, I have described the principle of operation of my invention together with the apparatus which I now consider to represent the best embodiment thereof but I would have it understood that the apparatus shown is only illustrative and that the invention may be carried out by other means.

What I claim as new and desire to secure by Letters Patent of the United States, is:

1. An electromagnetic device having hysteresis provided with means for modifying the effects of hysteresis therein, comprising an electromagnetic element having hysteresis, positioned to superimpose its field upon the field of said device in a direction to decrease the influence of the hysteresis in said device and energized so as to produce a flux proportional to the flux of said device.

2. An electromagnetic device comprising a coil for producing a field and a magnetic member having hysteresis within said field and hysteresis compensating means for said device comprising a second coil and magnetic member having hysteresis, positioned and energized to intensify the field of said device in proportion to the field strength of said device, the hysteresis of said two magnetic members having opposite effects upon the resultant field of said device.

3. An electromagnetic device comprising an energizing coil for producing a magnetic field, a magnetic member subjected to hysteresis loss within said coil, means for maintaining the flux through said member substantially proportional to the energizing current of said coil irrespective of such hysteresis loss, comprising a second coil surrounding said energizing coil and energized therewith so as to intensify the field produced thereby, and a core having a hysteresis loss within said second coil but external of said energizing coil.

4. An electromagnetic measuring instrument having an energizing winding for producing a main field flux and a magnetic member influenced by said field, said member having a hysteresis loss, hysteresis compensating means for said instrument comprising an auxiliary energizing winding for said instrument for producing a field which intensifies said first mentioned field, and a magnetic member having a hysteresis loss, positioned within said intensifying field but external to said main field.

5. An electromagnetic measuring instrument comprising two energizing windings which cooperate to produce the operating field of said instrument, magnetic vane means within said field for producing a measurement deflection proportional to the energizing current of said windings, said magnetic vane means having a hysteresis error, and magnetic means, only within the field produced by one of said windings and having hysteresis, for varying the operating field of said instrument in a manner to compensate for the hysteresis error of said magnetic vane means.

6. An electromagnetic measuring instrument comprising means for producing a magnetic field in proportion to the quantity to be measured, magnetic vane means influenced by said field to produce a measurement deflection, said magnetic vane means having a hysteresis error, and electromagnetic means for modifying the flux distribution of said magnetic field to compensate for such hysteresis error.

7. An electromagnetic measuring instrument comprising outer and inner cylindrical energizing coils concentrically arranged, a movable magnetic vane within said coils operated upon by the joint flux thereof to produce a measurement deflection, and a magnetic member located between said coils for modifying the flux distribution of said instrument to compensate for hysteresis errors.

8. An electromagnetic measuring instrument of the deflection type provided with hysteresis error compensating means, said compensating means being adjustable for varying the magnitude of such compensation at all deflections and for varying the relative magnitude of such compensation at different deflections.

In witness whereof, I have hereunto set my hand this 23rd day of March, 1927.

WILHELM HERZOG.